United States Patent
Mehlen et al.

(10) Patent No.: US 8,463,467 B2
(45) Date of Patent: Jun. 11, 2013

(54) DEVICE FOR CONTROLLING RELATIVE POSITION(S) BY ANALYZING DUAL-FREQUENCY SIGNALS, FOR A SPACECRAFT OF A GROUP OF SPACECRAFT IN FORMATION

(75) Inventors: Christian Mehlen, Etoile sur Rhone (FR); Estelle Pierre, La Colle sur Loup (FR)

(73) Assignee: Thales, Neuilly sur Seine (FR)

( * ) Notice: Subject to any disclaimer, the term of this patent is extended or adjusted under 35 U.S.C. 154(b) by 691 days.

(21) Appl. No.: 12/161,245

(22) PCT Filed: Jan. 19, 2007

(86) PCT No.: PCT/EP2007/050532
§ 371 (c)(1),
(2), (4) Date: Mar. 17, 2011

(87) PCT Pub. No.: WO2007/082929
PCT Pub. Date: Jul. 26, 2007

(65) Prior Publication Data
US 2011/0160939 A1    Jun. 30, 2011

(30) Foreign Application Priority Data

Jan. 19, 2006 (EP) .................................. 06300040

(51) Int. Cl.
*B64G 1/36* (2006.01)
*G05D 1/00* (2006.01)
*G05D 3/00* (2006.01)
*G06F 7/00* (2006.01)
*G06F 17/00* (2006.01)

(52) U.S. Cl.
USPC ............................................................. 701/13

(58) Field of Classification Search
USPC .................. 701/3, 4, 11, 13, 531; 244/158.1, 244/158.4, 158.6, 164, 171; 342/352, 355
See application file for complete search history.

(56) References Cited

U.S. PATENT DOCUMENTS 3,290,677 A    12/1966   Jacob
5,347,286 A     9/1994   Babitch et al.
(Continued)

FOREIGN PATENT DOCUMENTS
EP    0777128 A1    6/1997

OTHER PUBLICATIONS

Deininger W D et al: "Formation Flying Activies and Capabilities at Ball Aerospace" Aerospace Conference, 2003. Proceedings. 2003 IEEE Mar. 8-15, 2003, Piscataway, NJ, USA, IEEE, vol. 6, (Mar. 8, 2003), pp. 62599-62614, XP010660555; ISBN: 0-7803-7651-X.

*Primary Examiner* — Khoi Tran
*Assistant Examiner* — Nicholas Kiswanto
(74) *Attorney, Agent, or Firm* — Lowe Hauptman Ham & Berner, LLP

(57) ABSTRACT

A control device (D), for a spacecraft (S1) of a group of spacecraft moving in formation, comprises i) an assembly consisting of three antennas (A1-A3) installed on a face of the spacecraft (S1) and capable of emitting and/or receiving first and second RF signals exhibiting first and second frequencies spaced apart by a chosen frequency gap, ii) first measurement means (M1) charged with determining first and second differences in path length between antennas (A1-A3), corresponding to the first frequency and to the frequency gap, on the basis of the first and second signals received by the antennas and originating from another spacecraft, iii) second measurement means (M2) charged with delivering measurements of rotation undergone by the spacecraft (S1), and iv) processing means (MT) a) charged with coarsely estimating the direction of transmission of the signals received on the basis of first and second initial path length differences, b) with ordering the positioning of the spacecraft (S1) so that a chosen axis of a frame of reference tied to said spacecraft is aligned with respect to the coarse direction of transmission, c) with ordering the rotational turning of the spacecraft (S1) about the chosen axis, d) with precisely estimating the direction of transmission of the signals emitted by the other spacecraft (Si') on the basis of the rotation measurement and of a measurement of variation of the first path length difference induced by this rotation.

20 Claims, 3 Drawing Sheets

U.S. PATENT DOCUMENTS

| | | | | |
|---|---|---|---|---|
| 5,831,572 A | * | 11/1998 | Damilano | 342/352 |
| 5,999,127 A | * | 12/1999 | Dezelan | 342/359 |
| 6,005,514 A | * | 12/1999 | Lightsey | 342/365 |
| 6,072,433 A | | 6/2000 | Young et al. | |
| 6,150,977 A | * | 11/2000 | Wilcoxson et al. | 342/355 |
| 6,289,268 B1 | * | 9/2001 | Didinsky et al. | 701/13 |
| 6,417,798 B1 | * | 7/2002 | Joerck | 342/355 |
| 6,463,365 B1 | * | 10/2002 | Anagnost et al. | 701/13 |
| 6,463,366 B2 | * | 10/2002 | Kinashi et al. | 701/13 |
| 7,124,001 B2 | * | 10/2006 | Li et al. | 701/4 |
| 7,406,311 B2 | * | 7/2008 | Marko | 455/428 |

* cited by examiner

DEVICE FOR CONTROLLING RELATIVE POSITION(S) BY ANALYZING DUAL-FREQUENCY SIGNALS, FOR A SPACECRAFT OF A GROUP OF SPACECRAFT IN FORMATION

CROSS-REFERENCE TO RELATED APPLICATIONS

The present Application is based on International Application No. PCT/EP2007/050532, filed on Jan. 19, 2007, which in turn corresponds to European Application No. 06300040.0 filed on Jan. 19, 2006, and priority is hereby claimed under 35 USC §119 based on these applications. Each of these applications are hereby incorporated by reference in their entirety into the present application.

FIELD OF THE INVENTION

The invention relates to groups of spacecraft, such as for example satellites, intended to move in formation so as to collectively carry out a mission, and more precisely to the control of the relative positions of these spacecraft with respect to one another.

BACKGROUND OF THE INVENTION

As is known by the person skilled in the art, certain groups of spacecraft have to be positioned with respect to one another with a certain precision so as to collectively carry out a mission. This positioning nominally intervenes during several phases of the mission: deployment after launch, cruising, and tailoring of the formation to carry out its mission objective. Positioning can also intervene to perform a partial or total reconfiguration of the group, or to alleviate a technical failure (or an equipment fault) of at least one of the spacecraft.

Positioning by a relative GPS type technique is not always suited to this type of mission either because the altitude of the mission is too high with respect to the altitude of the GPS ("Global Positioning System") constellation, or because an additional or independent positioning means is required.

In order to allow such positioning, it has been proposed to equip spacecraft with a control device comprising at least, firstly, emission/reception antennas, optionally supplemented with reception antennas, installed on faces of different orientations of the spacecraft, and charged with emitting/receiving radiofrequency signals (RF), secondly, an "RF sensor" comprising notably first measurement means charged with estimating differences of path length of signals received between antennas, and thirdly, processing means charged with estimating the directions of transmission of the signals which are emitted by the other spacecraft of the group (generally called "lines of sight"), on the basis of the path length differences.

Such a control device can also comprise second measurement means charged with estimating each distance separating their spacecraft from one of the other spacecraft of the group, on the basis of the signals received by the antennas and of auxiliary signals transmitted by the other spacecraft of the group. In this case, the processing means can determine the relative positions of the spacecraft of the group with respect to a chosen frame of reference, on the basis of the estimated distances and of the estimated lines of sight.

Such a determination of relative positions then makes it possible to control the spacecraft of the group so as to bring them into and keep them in the geometric configuration required by the mission and to decide any avoidance maneuver should a risk of collision between spacecraft be detected.

Obtaining centimetric or sub-centimetric precision of the relative positions makes it necessary to work on carrier phase measurements. The person skilled in the art knows how to customarily measure the phase with a precision equal to a fraction of the wavelength (typically 5% of the wavelength in an environment with reasonable multi-paths). However, the phase measurements being known to within $2\pi$, they are ambiguous, and a difficulty consists in removing this ambiguity.

The use of signals with very high frequency (SHF or EHF) yields a wide frequency band, and this may facilitate ambiguity removal by means of carrier scan techniques or multi-carrier techniques. The decay of a signal in free space being proportional to the square of its frequency, when signals of very high frequency are used, either a high emitted power or a directional antenna is necessary, thereby limiting the domain of use of these very high frequencies. It is in fact not possible to determine the precise relative positions of the spacecraft of the group when their initial positions correspond to strongly inclined lines of sight.

The use of lower frequencies, such as those allocated in the S band to the onboard/ground and onboard/onboard space links (2.0 GHz to 2.2 GHz), makes it possible to use omni-directional antennas and a low emission power (below a watt for inter-spacecraft distances of several tens of kilometers). It is possible to use two frequencies about 100 MHz apart inside this band to facilitate ambiguity removal: the phase measurements arising from these two frequencies are then combined to obtain a phase measurement on a virtual carrier whose wavelength is longer. A possible combination consists in subtracting the phase measurements of the two frequencies, so as to obtain a phase measurement associated with the beat frequency of the two frequencies.

This makes it possible to go from a real wavelength of about 15 cm to a virtual wavelength of about 3 m. If the distance which separates the antennas equals for example 1m, the path length difference necessarily lies between −1 m and +1 m. The use of a wavelength of about 3 m then provides a non-ambiguous measurement of this path length difference. But this measurement is marred by a significant error: if the measurement error in the phase of the two frequencies is about 5% of the wavelength (5% of 15 cm equals 7.5 mm), the error in the combined phase measurement can attain 10% of the "long" wavelength (10% of 3 m equals 30 cm).

The main sources of error are the multi-paths and the residuals of calibration of propagation in the reception electronics. These errors evolve very slowly and are hard to filter, notably if the number of spacecraft is reduced to two, since there is then no observation redundancy.

SUMMARY OF THE INVENTION

The aim of the invention is therefore to improve the situation, notably on the basis of the following observations:
 the measurement of path length difference obtained by combining two frequencies is non-ambiguous, but approximate. However, the variation over time of the path length difference is not an ambiguous magnitude and can be measured in a precise manner by virtue of one of the two frequencies, and
 the variation of the path length difference observed in a host spacecraft may be the result of a lateral displacement of the other spacecraft or of a rotation of the host spacecraft, and these can be differentiated by means of an attitude sensor (such as for example a star tracker).

The invention proposes a control device, for a spacecraft of a group of spacecraft intended to move according to a chosen formation, and comprising at least one assembly consisting of an emission/reception antenna and of two receiving antennas installed at chosen locations on a face of the spacecraft and capable of emitting and/or receiving radiofrequency signals (RF), and processing means charged with estimating the directions of transmission of the signals emitted by the other spacecraft of the group on the basis of the signals received by the antennas of the assembly.

This control device is characterized in that:
  each antenna of each assembly is charged with emitting and/or receiving first and second RF signals exhibiting first and second chosen frequencies spaced apart by a chosen frequency gap,
  it comprises, on the one hand, first measurement means charged with determining first and second differences in path length between antennas, corresponding to the first or second frequency and to the frequency gap, on the basis of the first and second signals received by each of the antennas of the assembly originating from another spacecraft of the group, and on the other hand, attitude measurement means charged with delivering measurements of rotation undergone by the spacecraft, and
  its processing means are charged:
    with coarsely estimating the direction of transmission of the signals which are emitted by the other spacecraft on the basis of first and second so-called initial path length differences,
    with ordering the coarse positioning of the spacecraft so that a chosen axis of a frame of reference which is tied thereto is substantially aligned with respect to the direction of transmission which has been coarsely estimated,
    with ordering at least one chosen rotational turning of the spacecraft about the chosen axis, and
    with precisely estimating the direction of transmission of the signals emitted by the other spacecraft on the basis of the rotation measurement delivered by the attitude measurement means and of the measurement of variation of the first or second path length difference in the course of this rotation, performed by the first measurement means.

The device according to the invention can comprise other characteristics which can be taken separately or in combination, and notably:
  before ordering the rotational turning, its processing means can be charged with ordering the stabilization of the coarse positioning at near-zero speed by using the (precise) measurement of variation of one of the first and second path length differences, performed by the first measurement means;
  its processing means can be charged with retaining (subsequently) the precise knowledge of the direction of transmission by virtue of the measurement of the variations of one of the first and second path length differences;
  its first measurement means can be charged:
    with determining the first and second phases of the first and second signals received by each of the antennas of the assembly originating from the other spacecraft,
    with deducing from the first and second phases first and second differences in phase between the emission/reception antenna and each of the two receiving antennas,
    with deducing from the first and second phase differences third phase differences corresponding to the frequency gap (which itself preferably corresponds to a wavelength longer than twice the distance between the antennas),
    with deducing from first or second consecutive phase differences and from third consecutive phase differences measurements of variation of first or second path length difference, and
    with deducing from the measurements of variation of first or second path length difference non-ambiguous measurements of the first and second path length differences corresponding to the first or second frequency;
  it can comprise second measurement means charged with estimating the distance separating their spacecraft from the other spacecraft of the group on the basis of the first and/or second signals received by at least one of the antennas originating from the other spacecraft. With this aim, the first and/or the second signal is for example modulated, on the one hand, by a pseudo-random code making it possible to obtain a pseudo-distance measurement, and on the other hand, by data which allow the spacecraft to exchange information among which there is at the minimum their respective pseudo-distance measurements, so as to identify the clock bias and to obtain a true distance measurement. The distance measurement obtained by observing the pseudo-random code is rather imprecise, and its measurement noise can be reduced by a technique for smoothing the code by the carrier (well known to the person skilled in the art). The observation of the pseudo-random code received also allows the control device of the host spacecraft to ascertain the time of the control device of the other spacecraft, thereby making it possible to synchronize the periods of emission and reception between the spacecraft of the group;
  when the first and second measurement means are used, the processing means (MT) are charged with determining the relative positions of the spacecraft with respect to the host spacecraft on the basis of the estimated distances and of the precise estimated direction of transmission;
  its processing means can be charged with refining the distance measurement and/or the direction of transmission measurement by correcting them of the effect of multi-paths. This correction makes it necessary to possess tabulated cartographic data of multi-paths on spacecraft which were obtained previously, for example by means of trials in an anechoic chamber. The use of a tabulated cartographic mapping is effective only if the direction of transmission is ascertained with sufficient precision, such as that afforded by the invention;
  it can comprise at least two antenna assemblies on at least two faces of different orientations;
  it can comprise at least one complementary emission/reception antenna on at least one face devoid of any assembly of antennas;
  the antennas can be capable of emitting and/or receiving first and second radiofrequency signals taking the form of first and second carriers, at least one of which is modulated by a chosen pseudo-random code;
  the antennas can be capable of emitting/receiving first and second carriers exhibiting first and second frequencies belonging to a frequency band chosen from among the S, SHF and EHF bands.

The invention also proposes a spacecraft, intended to move in formation within a group of spacecraft, and equipped with a control device of the type of that presented above.

The invention also proposes a group of spacecraft, intended to move according to a chosen formation, at least one of the spacecraft of which comprises a control device of the type of that presented above, and at least some of the other spacecraft of which comprise at least one emission/reception antenna installed on at least one chosen face.

The invention is particularly well, although not exclusively, adapted to spacecraft of satellite type.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications, in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in figures of the accompanying drawings, wherein elements having the same reference numeral designations represent like elements throughout and wherein.

DETAILED DESCRIPTION OF THE INVENTION

The appended drawings will be able not only to serve to supplement the invention, but also contribute to its definition, if appropriate.

The object of the invention is to allow the determination, by a control device installed in a spacecraft of a group of spacecraft moving in formation, of precise lines of sight (with a precision of the coordinates of the line of sight of the order of a few mm), as well as optionally of precise inter-spacecraft distances (with a precision of the order of a centimeter), so as to ascertain the relative position of the spacecraft. This ascertaining of the relative positions of the spacecraft of the group can also make it possible to control them so as to bring them into and keep them in the geometric configuration required by the mission and to decide any avoidance maneuver should a risk of collision between spacecraft be detected.

In what follows, it is considered by way of nonlimiting example that the spacecraft of the group are satellites flying in formation so as to fulfill a space or earth observation mission.

However, the invention is not limited to this type of spacecraft. It relates in fact to all spacecraft intended to fly in formation according to a chosen configuration (optionally modifiable).

Figure 1:
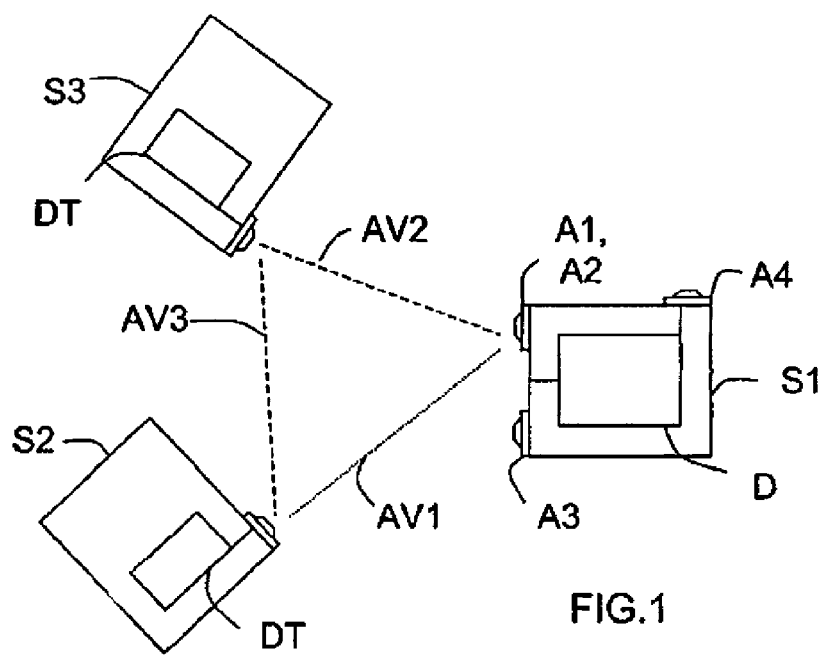
FIG. 1 illustrates in a very schematic manner a group of three satellites in formation, one of which comprises a control device according to the invention.
Figure 2:
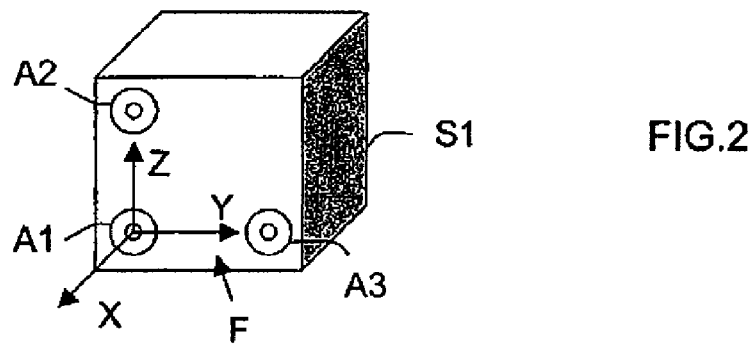
FIG. 2 illustrates in a very schematic manner an exemplary positioning of three antennas of one and the same assembly, on a satellite face.
Figure 3:
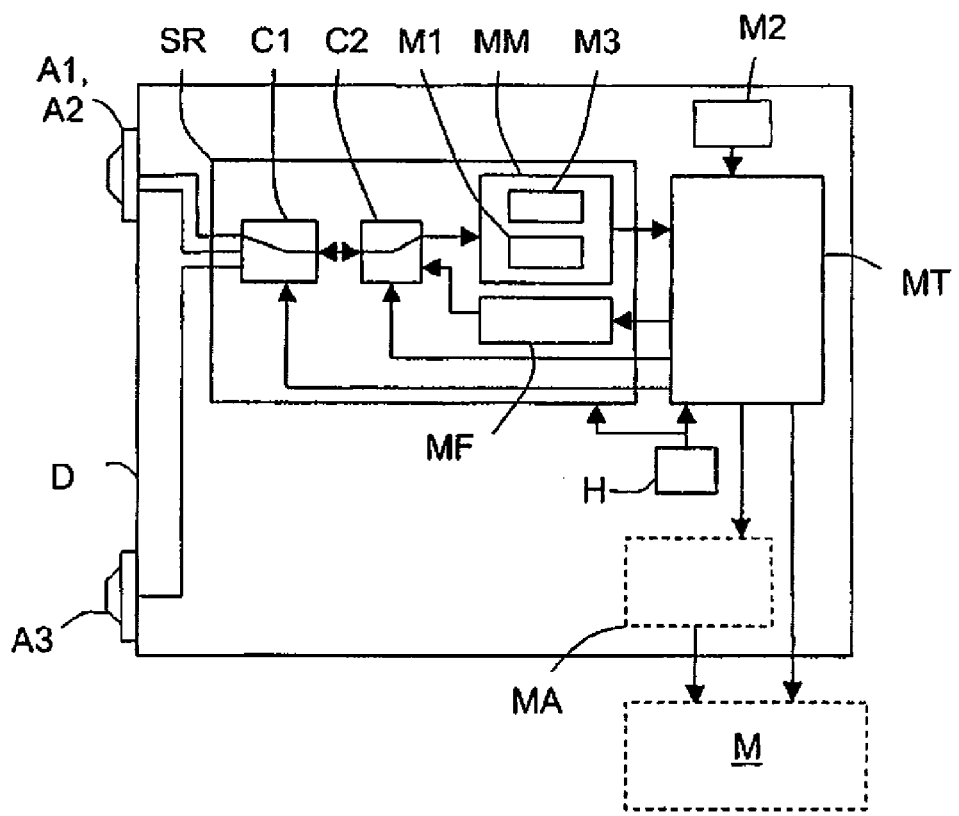
FIG. 3 illustrates in a very schematic manner an exemplary embodiment of a control device according to the invention.

FIGS. 1 to 3 are referred to first of all to present a group of spacecraft to which the invention can be applied.

In FIG. 1 is represented a group of three spacecraft (satellites) Si (i=1 to 3) flying in formation. It is important to note that the invention is not limited to groups comprising three spacecraft. It relates in fact to any group as long as it comprises at least two spacecraft.

Within such a group, at least one of the spacecraft, here S1, comprises a control device D according to the invention, while the other spacecraft, here S2 and S3, comprise a processing device DT. Of course, it is possible to envisage that within one and the same group several spacecraft, or indeed even all, comprise a control device D according to the invention.

A control device D, according to the invention, comprises at least one assembly consisting of an emission/reception antenna A1, termed the main antenna, and of two receiving antennas A2 and A3, termed secondary antennas. The three antennas Aj (j=1 to 3) of an assembly are installed at chosen locations on a face F of the spacecraft S1. An exemplary installation of an antenna assembly on a face F of a spacecraft S1 is illustrated schematically in FIG. 2.

It is important to note that a control device D can comprise several assemblies of three antennas Aj installed on faces of different orientations of one and the same spacecraft S1. It is also possible to envisage that a control device D comprise at least one assembly of three antennas Aj on one of its faces F, as well as at least one other emission/reception antenna A4, termed the complementary antenna, on at least one of its other faces (as is the case in the nonlimiting example illustrated in FIG. 1).

According to the invention, each main antenna A1 (and complementary antenna A4) is capable of emitting and receiving first and second radiofrequency signals (RF), exhibiting first f1 and second f2 chosen frequencies spaced apart by a chosen frequency gap f3 (with f3=f2−f1). Additionally, each secondary antenna A2, A3 is capable of receiving the first and second radiofrequency signals.

The first f1 and second f2 frequencies preferably belong to the S band. But, this is not compulsory. They may in fact belong to bands of frequencies that are higher than those of the S band, such as for example the SHF or EHF band.

The frequency gap f3 between the first f1 and second f2 frequencies preferably corresponds to a wavelength which is longer than twice the distance between the main antenna A1 and each of the secondary antennas A2 and A3.

It is considered hereinafter that the first f1 and second f2 frequencies belong to the S band. For example, f1=2.1 GHz and f2=2.2 GHz, thus giving a frequency gap f3=100 MHz.

Each processing device DT, fitted to a spacecraft S2, S3 devoid of control device D, comprises at least one emission/reception antenna A1, capable of emitting and receiving the first and second radiofrequency signals destined for and originating from other spacecraft of its group.

Each control device D also comprises a first measurement module MM and a second measurement module M2.

The first measurement module MM comprises for example a part of analog type to process the radiofrequency signals (RF) received and convert them into digital signals, and a part of digital type more precisely dedicated to the acquisition and tracking of the signals as well as to the production of the measurements.

As is schematically illustrated in FIG. 3, the first measurement module MM is for example coupled to the antennas Aj of each assembly (as well as to the possible complementary antennas A4) by way of first C1 and second C2 gating modules.

The first gating module C1 ensures the coupling with one or the other of the antennas as a function of instructions originating from a processing module MT regarding which more will be said further on.

The second gating module C2 is linked to an input/output of the first gating module C1 and, on the one hand, to the input of the measurement module MM, and on the other hand, to the output of a module MF for forming first and second signals (for the transmission part). It therefore allows the operation of the control device D either in signal reception mode, or in signal emission mode as a function of instructions originating from the processing module MT.

The control device D comprises a clock H which represents its local time and which is used to generate the frequencies of the carriers and to sequence the pseudo-random code (regarding which more will be said further on). It also provides clock signals necessary for the operation of at least some of its constituents, and notably necessary for controlling transmission and reception.

The first measurement module MM comprises at least one first measurement submodule M1 charged with determining first DM1 and second DM2 differences in path length between its main antenna A1 and its secondary antennas A2 and A3, corresponding respectively to the first frequency f1 (or the second frequency f2) and to the frequency f3 (equal to the frequency gap between f1 and f2), on the basis of the first and second signals received by each of the antennas Aj of an assembly originating from another spacecraft S2, S3 of its group.

Figure 4:
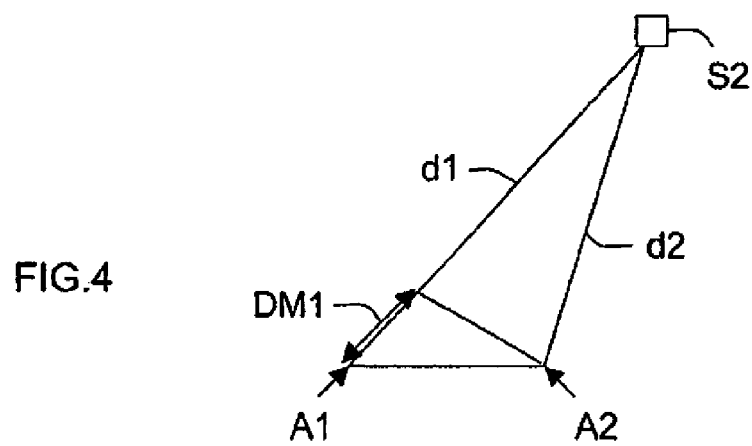
FIG. 4 illustrates in a schematic manner the difference in path length, between main and secondary antennas of a first satellite, of signals emitted by a second satellite.

In FIG. 4 is schematically illustrated an exemplary difference in path length DM1, between main A1 and secondary A2 antennas of an assembly installed on the face F of a spacecraft S1, of signals emitted by a spacecraft S2 of the same group. Here, DM1=d1−d2, d1 being the distance separating the spacecraft S2 from the main antenna A1 of the spacecraft S1, and d2 being the distance separating the spacecraft S2 from the secondary antenna A2 of the spacecraft S1.

Preferably, the first measurement submodule M1 undertakes the determination of the first DM1 and second DM2 path length differences, corresponding to the frequency f3, as indicated hereinafter.

First of all, the first measurement submodule M1 determines the first and second phases respectively of the first and second signals received by each of the antennas Aj of an assembly originating from another spacecraft S2 or S3.

Each signal takes at least the form of a carrier of a chosen frequency f1 or f2. At least one of the two frequencies f1 and f2 is preferably modulated by a chosen pseudo-random code, which is necessary for measuring inter-spacecraft distance and for synchronizing the periods of emission and reception between the spacecraft of the group. In this case, the measurement module MM is charged with acquiring the pseudo-random code and with deleting it from the carrier so as to allow its analysis.

Additionally, at least one of the two carriers can be modulated by data allowing the spacecraft to exchange information. In this case, the measurement module MM also ensures the carrier demodulation function so as to allow the extraction of the information data that it contains.

The carrier is thereafter analyzed in a manner known to the person skilled in the art by the first measurement submodule M1 so as to determine the first and second phase measurements. According to the technique implemented within the first measurement submodule M1, it is possible to obtain either first and second phase measurements for each antenna Aj, which are thereafter subtracted to obtain first and second phase differences between the main antenna A1 and each of the secondary antennas A2 and A3, for each of the first f1 and second f2 frequencies, or directly first and second phase differences between the main antenna A1 and each of the secondary antennas A2 and A3, for each of the first f1 and second f2 frequencies.

Then, the first measurement submodule M1 deduces first and second phase differences from the third phase differences corresponding to the frequency f3 (or frequency gap). More precisely, each third phase difference is a phase which corresponds to a third "dummy" signal constructed artificially on the basis of first and second signals received by one of the antennas Aj and exhibiting a frequency f3 equal to the frequency gap f2−f1.

Thereafter, the first measurement submodule M1 determines, on the one hand, two first path length differences DM1 between the main antenna A1 and the secondary antenna A2 on the basis respectively of a first or second phase difference and of a third phase difference, and on the other hand, two second path length differences DM2 between the main antenna A1 and the secondary antenna A3 on the basis respectively of a first or second phase difference and of another third phase difference.

The first measurement submodule M1 is also charged with determining first ΔDM1 and second ΔDM2 variations of path length difference between its main antenna A1 and its secondary antennas A2 and A3 respectively, corresponding to the first frequency f1. If the phase measurements are performed for example every second, the path length differences DM1 and DM2 are produced every second, and each variation ΔDM1, ΔDM2 represents the variation of the corresponding path length difference DM1, DM2 during the second elapsed.

These measurements of path length difference variation ΔDM1 and ΔDM2 are non-ambiguous measurements.

The second measurement module M2 is charged with measuring the attitude of the spacecraft S1, so as to deliver, at least, measurements representative of each rotation undergone by said spacecraft S1. It is independent of the measurement module MM, charged with processing the radiofrequency signals. It may for example be a star tracker.

Each control device D also comprises a processing module MT charged with performing at least the four tasks described hereinafter.

A first task of the processing module MT consists in estimating in a coarse manner the direction of transmission (or line of sight) AV of the signals, which are emitted by another spacecraft S2, on the basis of first DM1 and second DM2 initial path length differences.

The line of sight AV is a unit vector (for example length equal to a meter), two of whose coordinates are directly the path length differences DM1 and DM2, when considering a reference frame of which a first axis (Z, see FIGS. 2 and 5) links the main A1 and secondary A2 antennas, a second axis (Y) links the main A1 and secondary A3 antennas, and a third axis (X) is perpendicular to the other two axes (Y and Z). The third coordinate is of no value since the vector AV is normed. It is important to note that when the distance between antennas is not equal to a meter, the coordinates are determined on the basis of path length differences normalized by the distances between antennas.

This measurement is termed coarse since the measurement error in the first DM1 and second DM2 path length differences is amplified in the ratio of the wavelengths when constructing the measurement on the frequency gap f3.

A second task of the processing module MT consists in ordering a maneuver of the host spacecraft S1 in such a way that the chosen axis (X), nominally the one normal to the directions A1A2 (Z) and A1A3 (Y), is substantially aligned with respect to the direction of transmission (or line of sight) AV estimated in a coarse manner during the first task. Accordingly, the processing module MT calculates the attitude setpoint that the host spacecraft S1 must have having regard to the position of the chosen axis (X) with respect to the direction of transmission (or line of sight) AV estimated in a coarse manner, then it addresses this setpoint to the control module MD of the host spacecraft S1. A different strategy consists in calculating a relative position setpoint which leads to a lateral displacement maneuver of one of the two spacecraft rather than to a rotation maneuver of the host spacecraft S1. The choice between these two strategies depends on outside parameters linked with the mission.

Figure 5:
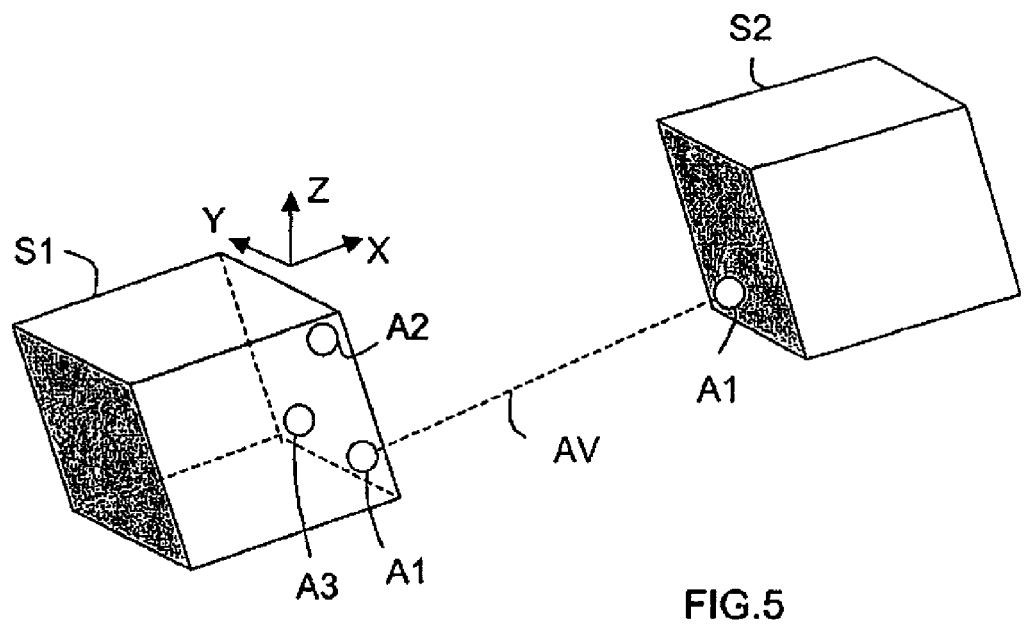
FIG. 5 illustrates in a very schematic manner the step of positioning a satellite, equipped with a control device according to the invention, with respect to a line of sight determined in a coarse manner.

In FIG. 5 is illustrated an exemplary alignment of the axis X, of the frame of reference (X, Y, Z) tied to the spacecraft S1, with respect to the estimated and coarse line of sight AV, defined with respect to the spacecraft S2. At this juncture, the precision of the estimated line of sight being average, alignment can therefore only be approximate.

This second task is continued preferably with the cancellation, if possible complete, of the relative movements of the host spacecraft S1 and of the other spacecraft S2. The objective here is to cancel the lateral relative speeds of the two spacecraft S1 and S2 so as to keep them in a fixed relative configuration.

Accordingly, the processing module MT uses the measurements of variation of the path length differences of the first carrier of frequency f1 or of the second carrier of frequency f2. The path length difference of the first carrier of frequency f1 (or of the second carrier of frequency f2) is ambiguous and precise, but its variation over time is not ambiguous, it therefore constitutes a beneficial speed measurement of the line of sight. Specifically, to be able to cancel the relative speed of the two spacecraft, it is necessary for a precise speed measurement to be available. A difficulty stems from the fact that only two precise coordinates of the speed of the line of sight (rate of its coordinate DM1 and rate of its coordinate DM2) are available whereas this speed vector is of dimension three. However, it can be shown that the third coordinate is negligible if the line of sight is close to the normal to the directions A1A2 and A1A3, thereby justifying the previous step consisting in coarsely aligning the line of sight AV and the normal to the directions A1A2 and A1A3.

On the basis of the speed measurements of the line of sight AV, the processing module MT calculates the maneuvers to be carried out so as to nearly cancel the speed of the line of sight AV. The maneuvers can be carried out by modifying the rate of displacement of the spacecraft S1 or by modifying the rate of displacement of the spacecraft S2 or by modifying the rate of rotation of the spacecraft S1 or else by combining these modifications. The strategy chosen depends on outside parameters linked with the mission. If the maneuver has to be performed by the spacecraft S1, the processing module MT dialogs with the control module MD of its spacecraft S1. If the maneuver has to be performed by the spacecraft S2, the transmission of the instructions to the remote spacecraft S2 is done for example by means of the main antenna A1, for example by using first and/or second signals.

A third task of the processing module MT consists in ordering at least one, chosen, rotational turning of the spacecraft S1 about the chosen axis, here X, and therefore substantially about the coarsely estimated line of sight AV. This rotation is measured precisely by the second measurement module M2. The value of the angle of rotation is not critical: the rotation must have a sufficient amplitude to attain the precision required by the fourth task of the processing module MT (typically a few tens of degrees).

During this rotation, the processing module MT records, by virtue of its first measurement submodule M1, the variation of the path length differences ΔDM1 and ΔDM2 on the first carrier exhibiting the frequency f1 or on the second carrier exhibiting the frequency f2.

A fourth task of the processing module MT consists in precisely estimating the line of sight between the spacecraft S1 and S2, on the basis of the rotation measurement delivered by the second measurement module M2 (dedicated to the attitude) and of the measurements of the variations of the path length differences ΔDM1 and ΔDM2 on the first carrier exhibiting the frequency f1 or on the second carrier exhibiting the frequency f2, delivered by the first measurement submodule M1.

This procedure for precisely estimating a line of sight will now be described in detail hereinafter with reference to a nonlimiting example illustrated in FIGS. 6 and 7. In what follows, AV denotes the line of sight estimated in a coarse manner (before rotation) and AV' denotes the precisely estimated line of sight.

Figure 6:
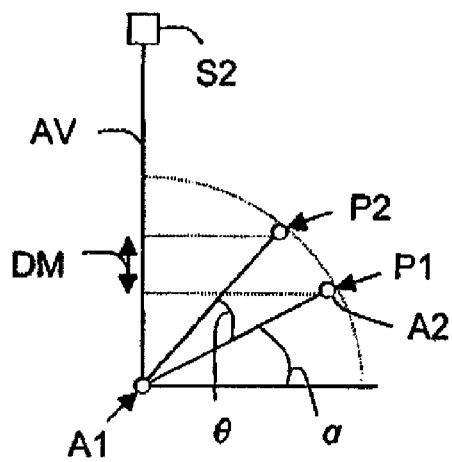
FIG. 6 illustrates in a very schematic manner the main parameters intervening in the determination of the precise coordinates of a line of sight in the presence of a rotation considered in a two-dimensional manner.

FIG. 6 illustrates in two dimensions a rotation of the spacecraft S1 with respect to the axis normal to the line of sight AV (determined coarsely). Here, only the displacement of the secondary antenna A2 from an initial position P1 (before rotation) to a final position P2 (after rotation by an angle θ) has been represented. This angle of rotation θ is measured precisely by the second (attitude) measurement module M2, for example of star tracker type. The rotation of angle θ introduces a variation of the first path length difference DM1 between the main A1 and secondary A2 antennas, which is determined by the processing module MT on the basis of the first measurements of initial path length difference (before rotation) and complementary path length difference (after rotation) delivered by the first measurement submodule M1. Knowing the distance BL1 separating the main A1 and secondary A2 antennas and the variation of the first path length difference DM1 (according to the first carrier exhibiting the frequency f1 or the second carrier exhibiting the frequency f2), the initial angle α of the disorientation of the direction A1A2 (Z) with respect to the line of sight AV' is deduced therefrom. The same operations are performed between the main antenna A1 and the other secondary antenna A3, and the precise coordinates defining the line of sight AV' are deduced from all the results.

It will be noted that this two-dimensional example (2D) is not completely representative of the three-dimensional (3D) real case. In the real case, it can be shown that a single rotation about the axis (X), normal to the directions A1A2 (Z) and A1A3 (Y), suffices to determine the precise line of sight AV' (S1S2) in a reference frame tied to the spacecraft S1.

A more sophisticated model than the two-dimensional one is described below with reference to FIG. 7. The Z axis of a frame of reference (X, Y, Z), tied to the spacecraft S1, is used here to point towards the spacecraft S2. The Z axis here defines the axis which has been aligned with respect to the coarse line of sight AV.

Figure 7:
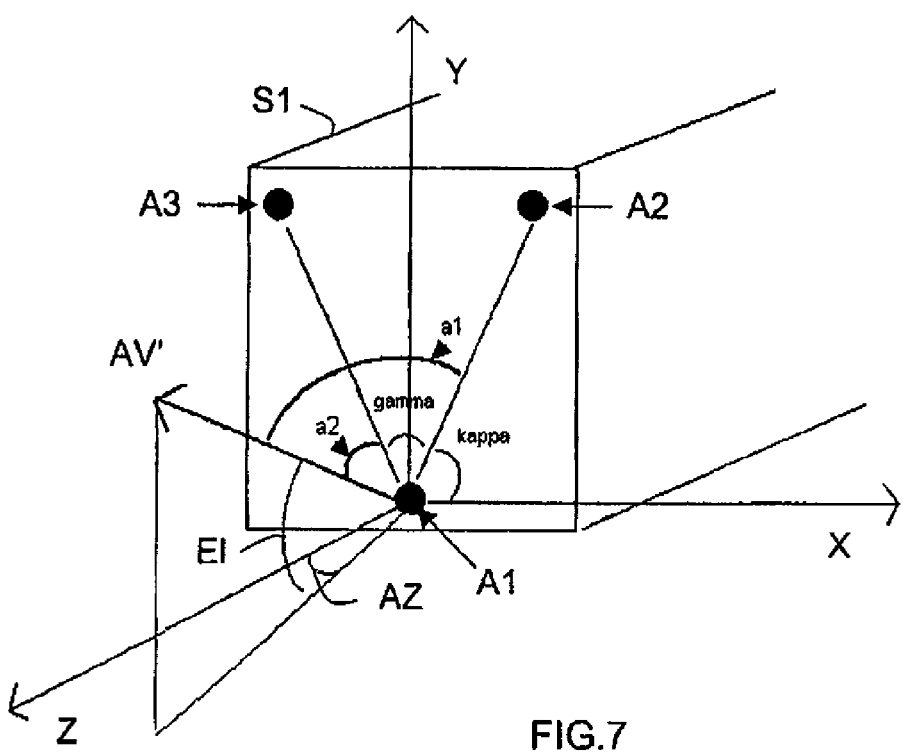
FIG. 7 illustrates in a very schematic manner the main parameters intervening in the determination of the precise coordinates of a line of sight in the presence of a rotation considered in a three-dimensional manner.

In FIG. 7, the reference AZ represents the azimuth of the precise line of sight AV' with respect to the Z axis and the reference EL represents the elevation of the precise line of sight AV' with respect to the ZX plane.

One seeks first of all to determine the relation existing between the angle of rotation θ of the spacecraft S1 about the Z axis, the path length difference variations and the coordinates of the coarse line of sight AV (before the rotation). In the presence of parallel incident signals, it can be shown that the path length difference can be defined as being the projection of the vector A1A2 onto the line of sight AV.

Consequently, if BL1 denotes the vector between the main A1 and secondary A2 antennas and $V_{LoS}$ denotes the unit vector of the coarse line of sight AV, we have the following relation:

$$DM1 = \langle \vec{BL}1 | \vec{V}_{LoS} \rangle$$

In the frame of reference (X, Y, Z) tied to the spacecraft S1, the unit vector $V_{LoS}$ (which defines the coordinates of the precise line of sight AV' that one wishes to estimate) is defined as indicated below:

$$\vec{V}_{LoS} = \begin{vmatrix} X \\ Y \\ Z = \sqrt{1 - X^2 - Y^2} \end{vmatrix}$$

The coordinates of the two secondary antennas A2 and A3 in the aforesaid frame of reference are well known and given below:

$$BL1 = \begin{vmatrix} x_1 \\ y_1 \\ z_1 \end{vmatrix} \text{ and } BL2 = \begin{vmatrix} x_2 \\ y_2 \\ z_2 \end{vmatrix}$$

Before the rotation of angle θ, the first DM1 and second DM2 path length differences are given by the following relations:

$$DM1 = \langle \vec{BL}1 | \vec{V}_{LoS} \rangle$$

$$DM2 = \langle \vec{BL}2 | \vec{V}_{LoS} \rangle$$

After the rotation of angle θ (which is defined by a rotation matrix Rot (θ)), the vectors BL1(θ) and BL2(θ) representing respectively the distances between the main antenna A1 and the secondary antennas A2 and A3, in the aforesaid frame of reference, are given by the following relations:

$$BL1(\theta) = Rot(\theta) \begin{vmatrix} x_1 \\ y_1 \\ z_1 \end{vmatrix} \text{ and } BL2(\theta) = Rot(\theta) \begin{vmatrix} x_2 \\ y_2 \\ z_2 \end{vmatrix}.$$

Consequently, the first DM1(θ) and second DM2(θ) complementary path length differences are given by the following relations:

$$DM1(\theta) = \langle Rot(\theta) \cdot \vec{BL}1 | \vec{V}_{LoS} \rangle$$

$$DM2(\theta) = \langle Rot(\theta) \cdot \vec{BL}2 | \vec{V}_{LoS} \rangle$$

The variations of the first and second path length differences (corresponding to the chosen frequency f1 or f2) can then be written:

$$\Delta DM1(\theta) = \langle Rot(\theta) \cdot \vec{BL}1 | \vec{V}_{LoS} \rangle - \langle \vec{BL}1 | \vec{V}_{LoS} \rangle = \langle [Rot(\theta) - Id] \vec{BL}1 | \vec{V}_{LoS} \rangle$$

$$\Delta DM2(\theta) = \langle Rot(\theta) \cdot \vec{BL}2 | \vec{V}_{LoS} \rangle - \langle \vec{BL}2 | \vec{V}_{LoS} \rangle = \langle [Rot(\theta) - Id] \vec{BL}2 | \vec{V}_{LoS} \rangle$$

Employing the following matrix notation:

$$\Delta DM = \begin{bmatrix} \Delta DM1 \\ \Delta DM2 \end{bmatrix}$$

we then have the following relation, where the exponent indicates a transposed matrix element:

$$\Delta DM = \begin{bmatrix} [(Rot(\theta) - Id) BL1] \\ [(Rot(\theta) - Id) BL2] \end{bmatrix} \cdot V_{LoS} = \begin{bmatrix} BL1' \\ BL2' \end{bmatrix} [Rot(\theta) - Id] V_{LoS}$$

The latter expression not being easily invertible because its first term (BL1$^t$, BL2$^t$) represents a matrix of type 2×3, we then reduce to two dimensions instead of three. This can be done by exploiting the fact, on the one hand, that the vector $V_{LoS}$ is a unit vector and that its Z coordinate is therefore of no interest since it is deduced from its X and Y coordinates, and on the other hand, that the rotation of angle θ is performed about the Z axis. Consequently, the above formula can be rewritten in two dimensions (in the X, Y plane) as indicated below:

$$V_{LoS\_2D} = [Rot(-\theta_z) - Id]^{-1} \begin{bmatrix} BL1'_{2D} \\ BL2'_{2D} \end{bmatrix}^{-1} \Delta DM$$

Once the processing module MT is in possession of the line of sight coordinates (coarse before the rotation), it can henceforth ascertain at any moment the precise coordinates of this line of sight by integrating the path length difference variations ΔDM1 and ΔDM2. A variant consists in using the knowledge of the precise line of sight AV' to remove the ambiguity in the measurements DM1 and DM2 performed on the first frequency f1 (or the second frequency f2), then in retaining the ambiguity on the basis of the path length difference variations ΔDM1 and ΔDM2.

If there are other spacecraft (for example S3) equipped with a device DT, the same procedure can be repeated between the spacecraft S1 and S3 to precisely measure the line of sight S1S3 in the reference frame tied to the spacecraft S1. During the conduct of this procedure between the spacecraft S1 and S3, it is necessary to take care that the spacecraft S2 remains visible to the spacecraft S1. Specifically, if the RF link is broken between the spacecraft S1 and S2, the knowledge of the precise line of sight AV' (S1S2) might be lost and it is necessary to recommence the procedure between the spacecraft S1 and S2.

If there is at least one other spacecraft (for example S4) equipped with a device D, the spacecraft S4 can itself precisely determine the line of sight of the other spacecraft in its own reference frame by performing this same procedure. The benefit of furnishing several spacecraft of the group with the device D instead of the device DT depends on the mission.

Once the line of sight is known with precision, this precision can be further improved if a tabulated cartographic mapping of the multi-paths has been previously performed and stored in the form of cartographic data. In this case the processing module MT subtracts the known contribution of the multi-paths from the measurements of path length differences on the signals exhibiting the first frequency f1. This technique is particularly effective when the multi-paths are caused by local reflections at the host spacecraft. In this case, the error due to multi-paths is entirely related to the direction of arrival of the signal.

It will be noted that the matrix formulae given above are simplified so as to facilitate their understanding. In reality, several side effects may complicate them:

a residual speed may persist at the end of the lateral speed cancellation phase, the rotation ordered by the processing module MT may differ from the rotation actually performed by the spacecraft, notably the real rotation axis may be falsified with respect to the axis perpendicular to the directions A1A2 and A1A3, the radiofrequency waves received by the various antennas Aj are not perfectly parallel if the distance between the spacecraft S1 and S2 is not very large with respect to the distance between the antennas A1, A2 and A3.

However, these effects can be corrected by the person skilled in the art by complicating the formulae on the basis of the simplified formulae.

Independently of the measurement of the precise line of sight AV', the devices D and DT can be arranged so as to measure the distance separating the spacecraft.

Accordingly, the control device D must comprise, preferably in its first measurement module MM, a second measurement submodule M3. The latter is more precisely charged with estimating each distance separating its spacecraft S1 from another spacecraft S2 of the same group on the basis at least of the first and/or second signals received by at least one of the antennas, and preferably by an emission/reception antenna A1 (or A4), and originating from this other spacecraft S2.

In what follows it is considered, by way of illustrative and nonlimiting example, that the second measurement submodule M3 estimates the inter-spacecraft distances on the basis of the first signals received by the main antenna A1.

Because of the temporal biases introduced by the absence of synchronization between the clocks H of the spacecraft S1 and S2, the second measurement submodule M3 preferably performs its distance estimation on the basis not only of the first signals which are received by the main antenna A1 originating from the other spacecraft S2, but also of auxiliary signals which are transmitted by this other spacecraft S2.

As indicated previously, these auxiliary signals preferably consist of a modulation of the carrier of the first signal by means of a chosen pseudo-random code, as well as optionally of information data, in such a way that the signal emitted is the image of the local time of the emitter spacecraft and that the observation of this signal makes it possible to obtain a pseudo-distance measurement.

By contrasting its own pseudo-distance measurement with that transmitted by the other spacecraft S2 in the form of information data in the auxiliary signals, the second measurement submodule M3 can isolate the clock bias and ascertain the inter-spacecraft distance d(S1, S2). Specifically, the true distance is equal to the half-sum of the pseudo-distance measured by the spacecraft S1 on the first signal emitted by the spacecraft S2 and of the pseudo-distance measured by the spacecraft S2 on the first signal emitted by the spacecraft S1.

The distance measurement obtained by analyzing the pseudo-random code is non-ambiguous but of mediocre precision since the wavelength of the pseudo-random code is customarily much larger than that of the carrier. If the precision of the distance measurement obtained by observing the pseudo-random code is better than half the wavelength of the frequency f3 then this approximate distance measurement makes it possible to remove the ambiguity in the distance measurement obtained on the basis of the phase measurements on the frequency f3 (performed on the main antennas of the spacecraft S1 and S2). One thus obtains a distance measurement of better quality than that obtained on the basis of the pseudo-random code. However, the quality of this distance measurement is still too poor to be able to resolve the ambiguity in the distance measurement obtained on the basis of the phase measurements of the frequency, since the precision of the phase measurements on f3 is degraded in the ratio of the wavelengths f3/f1.

A last step is then provided so as to attain centimetric precision in the distance measurement. Accordingly, three techniques are preferably combined.

A first technique consists in smoothing the measurement noise. This first technique, well known to the person skilled in the art, consists more precisely in filtering a non-ambiguous but highly noisy quantity through its rate of variation, if the latter is known in a not very noisy manner. Here, the distance measurement, obtained on the basis of the pseudo-random code, is smoothed through the speed obtained on the basis of the variation of the phase measurements on the first signal (f1). Then, the distance measurement, obtained on the basis of the phase measurements on the frequency gap f3, is smoothed through the speed obtained on the basis of the variation of the phase measurements on the first signal (f1). The aim is to reduce the noise in the distance. This technique makes it possible to reduce the measurement noise, but it does not reduce the errors of "slowly variable bias" type which result from multi-paths and the propagation of the signals in the signal emission and reception electronics.

A second technique consists in correcting the effect of the propagation (propagation lag and propagation phase shift) in the emission and reception electronics, by auto-calibration. A fraction of the amplitude of all the signals which are dispatched by the module SR to the main antenna A1 is then redirected into the module SR.

Analysis of these signals in the measurement module MM makes it possible to precisely measure the quantity corresponding to the propagation in the emission electronics of the spacecraft S1 and to the propagation in the reception electronics of the spacecraft S1. The same technique is used in the spacecraft S2 to measure the quantity corresponding to the propagation in the emission electronics of the spacecraft S2 and to the propagation in the reception electronics of the spacecraft S2.

Each of these two quantities in isolation is of no interest, but the sum of these two quantities can be rewritten as the sum of the electronic propagation of the route S1 towards S2 and of the electronic propagation of the route S2 towards S1. This sum then makes it possible to correct the distance since the latter is the result of the sum of the pseudo-distance between the spacecraft S1 and the spacecraft S2 and of the pseudo-distance between the spacecraft S2 and the spacecraft S1.

This correction has as many components as the number of components in the signals transmitted (propagation of the pseudo-random code, propagation of the carrier of frequency f1 and propagation of the carrier of frequency f2). It therefore makes it possible to correct the distance obtained by the pseudo-random code and the distances obtained on the carriers of frequencies f1, f2 and f3.

A third technique consists in correcting the effect of multi-paths by using a tabulated cartographic mapping of these multi-paths on the spacecraft S1 and on the spacecraft S2. The use of such a cartographic mapping makes it necessary to precisely ascertain the line of sight AV' (S1S2) in a reference frame tied to S1 (this being done by means of the procedure described above). It also makes it necessary to ascertain the line of sight S2S1 in a reference frame tied to S2, and this may be obtained either because S2 is furnished with a device D, or because it is furnished with a device DT plus an attitude sensor. Specifically, it can be shown that the knowledge of the line of sight AV' (S1S2) in a reference frame tied to S1 and the knowledge of the attitude of the spacecraft S2 suffice to ascertain the line of sight S2S1 in a reference frame tied to the spacecraft S2.

Knowing the precise estimate of the inter-spacecraft distance d(S1, S2) or d(S1, S3) and the precise estimate of the coordinates of the corresponding line of sight AV1 or AV2, the processing module MT then ascertains the relative positions of the two spacecraft S2 and S3 with respect to the frame of reference (X, Y, Z) which is tied to its spacecraft S1 (or else any other frame of reference tied to the spacecraft S1).

As is illustrated in FIG. 3 by way of nonlimiting example, the control device D can also comprise an analysis module MA charged with controlling the spacecraft of the group so as to bring them into and keep them in the geometric configuration required by the mission and to decide any avoidance maneuver should a risk of collision between spacecraft be detected. Any type of control of the position of the spacecraft of the group and of collision risk detection known to the person skilled in the art can be implemented at this juncture.

Each time it detects a risk of collision, the analysis module MA can also and optionally determine an avoidance maneuver for its spacecraft S1 as a function of the relative positions of the other spacecraft of the group.

The control device D according to the invention, and notably its processing module MT, its first MM and second M2 measurement modules, and its optional analysis module MA, can be embodied in the form of electronic circuits, software (or computation) modules, or a combination of circuits and software.

Within the control device D, the first measurement module MM, the gating modules C1 and C2, the beam formation module MF, as well as optionally the second (attitude) measurement module M2, can be united into an entity constituting a dual-frequency sensor SR.

When the invention operates in the S band, it is possible to use non-directional antennas, and consequently it is possible to obtain centimetric precision in the relative positions of spacecraft flying in formation, whatever their initial relative positions, and notably when the lines of sight are weakly or strongly inclined initially.

Additionally, the invention can serve to supply precise relative positions to prior art control devices operating for example in SHF or EHF or based on optical signals and requiring precise prepositioning so as to be able to determine the relative positions of the spacecraft with even greater precision, typically one or more orders of magnitude greater.

The invention is not limited to the control device and spacecraft embodiments described above, merely by way of example, but it encompasses all variants that may be envisaged by the person skilled in the art within the scope of the claims hereinafter.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A control device (D), for a spacecraft (Si) of a group of spacecraft intended to move according to a chosen formation, comprising:
at least one assembly including an emission/reception antenna (A1) and of two receiving antennas (A2, A3) installed at chosen locations on a face of said spacecraft (Si) and able to emit and/or receive radiofrequency signals,
processing means (MT) designed to estimate the directions of transmission of the signals emitted by other spacecraft of the group on the basis of said signals received by said antennas (A1-A3),
each antenna (A1-A3) of said assembly is designed to emit and/or receive first and second signals exhibiting first and second chosen frequencies spaced apart by a chosen frequency gap,
first measurement means (M1) designed to determine first and second differences in path length between antennas (A1-A3), corresponding to the first or second chosen frequencies and to said frequency gap, on the basis of the first and second signals received by each of said antennas of said assembly originating from another spacecraft (Si') of said group,
attitude measurement means (M2) designed to deliver measurements of rotation undergone by said spacecraft (Si),
wherein said processing means (MT) are designed to a) coarsely estimate the direction of transmission of the signals emitted by said other spacecraft (Si') on the basis of first and second initial path length differences, b) order a coarse positioning of said spacecraft (Si) so that a chosen axis (X) of a frame of reference tied to said spacecraft is substantially aligned with respect to said coarsely estimated direction of transmission, c) order at least one chosen rotational turning of said spacecraft (Si) about said chosen axis (X), d) precisely estimate said direction of transmission of the signals emitted by said other spacecraft (Si') on the basis of the rotation measurement delivered by said attitude measurement means (M2) and of a measurement of variation of the first or second initial path length differences induced by said rotation, performed by said first measurement means (M1).

2. The device as claimed in claim 1, wherein said processing means (MT) generate, before ordering said rotational turning, instructions intended to order a stabilization of the coarse positioning at near-zero speed of said spacecraft (Si), on the basis of said measurement of variation of one of the first and second path length differences performed by said first measurement means (M1).

3. The device as claimed in claim 2, wherein said processing means are designed to retain a precise knowledge of said direction of transmission, on the basis of said measurements of variation of one of the first and second path length differences.

4. The device as claimed in claim 2, wherein said first measurement means (M1) are designed to i) determine the first and second phases of the first and second signals received by each of said antennas (A1-A3) of said assembly originating from said other spacecraft (Si'), ii) deduce from said first and second phases first and second differences in phase between said emission/reception antenna (A1) and each of said receiving antennas (A2, A3), iii) deduce from said first and second phase differences third phase differences corresponding to said frequency gap, iv) deduce from first or second consecutive phase differences and from third consecutive phase differences measurements of variation of first or second path length difference, and v) deduce from the measurements of variation of first or second path length difference non-ambiguous measurements of said first and second path length differences corresponding to the first or second frequency.

5. The device as claimed in claim 2, comprising second measurement means (M3) designed to estimate the distance separating their spacecraft (Si) from said other spacecraft (Si') of the group, on the basis of said first and/or second signals received by at least one of said antennas (A1-A3) originating from said other spacecraft (Si'), and in that said processing means (MT) are designed to determine the relative positions of said spacecraft (Si') with respect to their spacecraft (Si), on the basis of said estimated distances and of said precise estimated direction of transmission.

6. The device as claimed in claim 1, wherein said processing means are designed to retain a precise knowledge of said direction of transmission, on the basis of said measurements of variation of one of the first and second path length differences.

7. The device as claimed in claim 6, wherein said first measurement means (M1) are designed to i) determine the first and second phases of the first and second signals received by each of said antennas (A1-A3) of said assembly originating from said other spacecraft (Si'), ii) deduce from said first and second phases first and second differences in phase between said emission/reception antenna (A1) and each of said receiving antennas (A2, A3), iii) deduce from said first and second phase differences third phase differences corresponding to said frequency gap, iv) deduce from first or second consecutive phase differences and from third consecutive phase differences measurements of variation of first or second path length difference, and v) deduce from the measurements of variation of first or second path length difference non-ambiguous measurements of said first and second path length differences corresponding to the first or second frequency.

8. The device as claimed in claim 1, wherein said first measurement means (M1) are designed to i) determine the first and second phases of the first and second signals received by each of said antennas (A1-A3) of said assembly originating from said other spacecraft (Si'), ii) deduce from said first and second phases first and second differences in phase between said emission/reception antenna (A1) and each of said receiving antennas (A2, A3), iii) deduce from said first and second phase differences third phase differences corresponding to said frequency gap, iv) deduce from first or second consecutive phase differences and from third consecutive phase differences measurements of variation of first or second path length difference, and v) deduce from the measurements of variation of first or second path length difference non-ambiguous measurements of said first and second path length differences corresponding to the first or second frequency.

9. The device as claimed in claim 1, comprising second measurement means (M3) designed to estimate the distance separating their spacecraft (Si) from said other spacecraft (Si') of the group, on the basis of said first and/or second signals received by at least one of said antennas (A1-A3) originating from said other spacecraft (Si'), and in that said processing means (MT) are designed to determine the relative positions of said spacecraft (Si') with respect to their spacecraft (Si), on the basis of said estimated distances and of said precise estimated direction of transmission.

10. The device as claimed in claim 9, wherein said second measurement means (M3) are designed to estimate the distance separating their spacecraft (Si) from said other spacecraft (Si') of the group, on the basis of said first and/or second signals received by at least one of said antennas (A1-A3) originating from said other spacecraft (Si'), and of auxiliary signals transmitted by said other spacecraft (Si') and representative of the distance separating it from said spacecraft (Si).

11. The device as claimed in claim 9, wherein said processing means (MT) are designed to correct said distance measurement and/or said measurement of precise direction of transmission of an effect induced by multi-paths, on the basis of stored cartographic data and of said direction of transmission of the signals.

12. The device as claimed in claim 10, wherein said processing means (MT) are designed to correct said distance measurement and/or said measurement of precise direction of transmission of an effect induced by multi-paths, on the basis of stored cartographic data and of said direction of transmission of the signals.

13. The device as claimed in claim 1, comprises comprising at least two antenna assemblies on at least two faces of different orientations.

14. The device as claimed in claim 1, comprising at least one complementary emission/reception antenna (A4) on at least one face devoid of any assembly of antennas.

15. The device as claimed in claim 1, wherein said antennas (A1-A3) are able to emit and/or receive first and second radiofrequency signals taking the form of first and second carriers, at least one of which is modulated by a chosen pseudo-random code.

16. The device as claimed in claim 1, wherein said frequency gap corresponds to a wavelength of length at least equal to twice the distance separating said emission/reception antenna (A1) from each of said receiving antennas (A2, A3).

17. The device as claimed in claim 1, wherein said antennas (A1-A3) are designed to emit/receive first and second carriers exhibiting first and second frequencies belonging to a frequency band chosen from a group comprising the S, SHF and EHF bands.

18. The device as claimed in claim 17, wherein said frequency band is the S band.

19. A spacecraft (S1) intended to move in formation within a group of spacecraft, comprising a control device (D) as claimed in claim 1.

20. A group of space craft (Si), intended to move according to a chosen formation, wherein at least one of said spacecraft (S1) comprises at control device (D) as claimed in claim 1, and in that at least some of the other spacecraft (S2, S3) comprises at least one emission/reception antenna (A1) installed on at least one chosen face.

* * * * *